United States Patent
Vash et al.

(10) Patent No.: US 8,359,436 B2
(45) Date of Patent: Jan. 22, 2013

(54) CORE SNOOP HANDLING DURING PERFORMANCE STATE AND POWER STATE TRANSITIONS IN A DISTRIBUTED CACHING AGENT

(75) Inventors: James R. Vash, Littleton, MA (US); Rishan Tan, Shrewsbury, MA (US)

(73) Assignee: Intel Corporation, Santa Clara, CA (US)

(*) Notice: Subject to any disclaimer, the term of this patent is extended or adjusted under 35 U.S.C. 154(b) by 394 days.

(21) Appl. No.: 12/641,728

(22) Filed: Dec. 18, 2009

(65) Prior Publication Data

US 2011/0153924 A1    Jun. 23, 2011

(51) Int. Cl.
*G06F 12/08* (2006.01)
*G06F 1/32* (2006.01)

(52) U.S. Cl. .................................. 711/146; 713/320
(58) Field of Classification Search .................. None
See application file for complete search history.

(56) References Cited

U.S. PATENT DOCUMENTS

| | | | |
|---|---|---|---|
| 5,809,532 A * | 9/1998 | Eno et al. ...................... 711/141 |
| 6,085,330 A * | 7/2000 | Hewitt et al. .................. 713/322 |
| 7,373,534 B2 | 5/2008 | Cline | |
| 7,398,361 B2 | 7/2008 | Gunna et al. | |
| 7,502,892 B2 | 3/2009 | Hammarlund et al. | |
| 7,523,327 B2 | 4/2009 | Cline et al. | |
| 7,802,119 B2 * | 9/2010 | Huang et al. ................... 713/323 |
| 2010/0174936 A1 * | 7/2010 | Hill et al. ...................... 713/500 |

\* cited by examiner

*Primary Examiner* — Gary Portka
(74) *Attorney, Agent, or Firm* — Jordan IP Law, LLC

(57) ABSTRACT

A method and apparatus may provide for detecting a performance state transition in a processor core and bouncing a core snoop message on a shared interconnect ring in response to detecting the performance state transition. The core snoop message may be associated with the processor core, wherein a plurality of processor cores may be coupled to the shared interconnect ring via a distributed last level cache controller.

7 Claims, 2 Drawing Sheets

CORE SNOOP HANDLING DURING PERFORMANCE STATE AND POWER STATE TRANSITIONS IN A DISTRIBUTED CACHING AGENT

BACKGROUND

1. Technical Field

Embodiments generally relate to power management in computing systems. More particularly, embodiments relate to power management in multi-core computing systems having distributed cache controller architectures.

2. Discussion

While multi-core processors in computing systems may address an increase in the complexity of the computing needs and habits of users, a number of challenges can remain. For example, conventional solutions may conduct processor power and performance management operations on a per-core basis, while a centralized cache controller might be used to maintain cache coherency of the last level cache (LLC) shared by the processor cores. Thus, if a particular core undergoes a performance state transition or is placed in a low power state, a typical approach to handling snoop requests may be to simply pause or discontinue issuing core snoop messages to that core. Such an approach may not be sufficient in more distributed cache controller architectures.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

If a processor core performs a performance state (P-state, e.g., voltage/frequency) transition, or enters a deep sleep central processing unit (CPU) power state (C-state, e.g., C3-C6), it may either temporarily or completely stop responding to external requests (snoop messages/"snoops", interrupts). In some designs where multiple cores share a last-level cache (LLC), a caching agent may be responsible for filtering and sending core snoops. Furthermore, this caching agent may be implemented in a distributed fashion, with multiple LLC cache controller modules sending core snoops via a shared interconnect (e.g., ring) to individual cores that may be undergoing various power state transitions.

In particular, a microprocessor might integrate multiple (e.g., eight) cores on a single die, where the cores share an LLC (e.g., 24 MB LLC), which is implemented as a plurality of "slices" (e.g., eight separate 3 MB LLC slices). Each LLC slice may be managed by a separate cache controller module that is co-located with the LLC slice in question. In addition, the LLC may have directory information for each cache line, known as "core valid" bits, which track the cores that may have a copy of a given line and facilitate snoop filtering. Each cache controller module can therefore send snoops to any (sub)set of cores via a multicast message on a uni-directional IV (inval) ring. A processor may also have an advanced PCU (power control unit) that can manage on-die power via increasing or decreasing core voltage/frequency (P-state transitions) or power states (C-state transitions).

In one example, these transitions may be Advanced Configuration and Power Interface Specification (ACPI Specification, Rev. 4.0, Jun. 16, 2009) state transitions. Although certain embodiments may be described with reference to ACPI states being used as low power and performance states, the embodiments are not so limited. Indeed, the principles described herein can be useful with any type of processor low power or performance state protocol. Notwithstanding, there are a number of embodiments for which ACPI states are well suited. Thus, when a core changes frequency, its clocks may temporarily stop to relock to the new frequency, temporarily leaving it unable to respond to external requests. When a core enters a low power state such as the ACPI C3 state, its caches may be flushed and its clocks can be stopped to save power, rendering its interface with the shared interconnect inactive. Such a state may be considered to be a "non-snoopable" state.

Generally, a method can be established to handle core snoop processing in the presence of these transitions that is amenable to a design where the LLC cache controller sending the core snoops is implemented in a distributed manner, and it is not simple to pause, abort, or halt the core snoops at the source.

Figure 1:
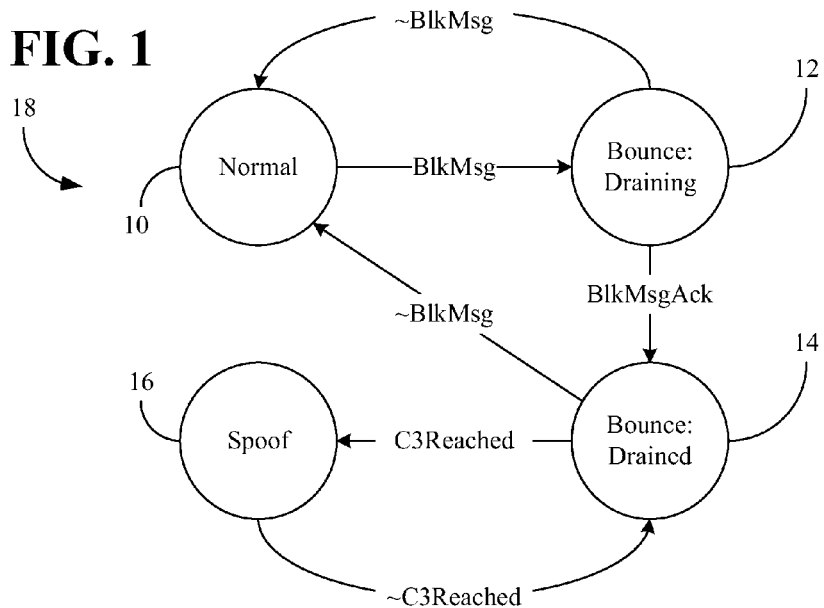
FIG. 1 is a state diagram of an example of a scheme of handling core snoops during performance and power state transitions according to an embodiment.

With specific regard to FIG. 1, a state diagram 18 demonstrates that when a PCU desires to start a power state transition, it may assert a block message ("BlkMsg") signal for the core in question. Accordingly, the cache controller module corresponding to the core in question may switch from a normal state 10 to a draining bounce state 12. While in the illustrated draining bounce state 12, the co-located controller module managing the interface with the core in question will start to "bounce" core snoop messages targeted at that core. To "bounce" a message coming from the ring interconnect can mean to leave it on the ring, rather than sinking (e.g., accepting) the message. Therefore, the message may continue around the ring, and attempt to sink again when it returns. The LLC cache controller module can force messages to bounce by forcing protocol-layer credits for core snoops (SNPQ credits) to appear as unavailable to the ring interface. While certain credit flow control techniques such as SNPQ credits, link-layer core snoops (FCF), and bubble-generator (e.g., clock crossing) first in first out/FIFO (BGF) credits may be used herein to facilitate discussion, embodiments are not limited to any specific credit flow control protocol or structure.

Meanwhile, the controller module can track the outstanding SNPQ credits. When all credits have been returned, the corresponding core can be considered to no longer have any snoops outstanding (i.e., all associated response and data messages have been sent to the uncore). At this point, the LLC cache controller module may switch to the drained bounce state 14 and return a block message acknowledge ("BlkMsgAck") signal to the PCU, indicating that core snoops have drained. This signal can also prevent link-layer credits (e.g., FCF credits) from being returned to the core for the core-to-uncore data channel. If such credits existed for the core-to-uncore response channel, the same may be done for them. This may prevent the credits from being lost when the core interface becomes inactive.

If a P-state transition is desired, the PCU at this point can proceed to change the core clock frequency. When core clock frequency change is complete, the PCU can deassert the "BlkMsg" signal, which will cause the LLC cache controller module to stop forcing snoops to bounce at the ring interface and return to the normal state 10 and normal snoop processing in the illustrated example.

If instead, a low power state such as the C3 (or deeper sleep state) entry transition is desired, the PCU at this point may proceed to stop the core clocks. When the core clocks have been stopped, the PCU may assert a low power level reached ("C3Reached") signal for the core in question. This signal may cause the co-located LLC cache controller module to enter the illustrated spoof state 16. In this state 16, the cache controller module may intercept snoop messages and spoof responses to them, where the spoofed responses indicate that the core does not have any of the requested lines in its cache.

This spoofing can be accomplished by the following:

1. Force SNPQ credits to appear as available to the ring interface. Though the SNPQ may not be used during spoofing, SNPQ credits can be temporarily consumed when core snoop messages are sunk.

2. Force BGF (bubble-generator, a.k.a. clock-crossing, FIFO) credits to appear as available to the ring interface (since the BGFs may be stopped along with the core clocks).

3. Shoot down (e.g., negate) the core snoop message valid bit on its way to the core interface.

4. Correct the SNPQ credit counter by returning credit internally. The SNPQ credit counter can change temporarily between when a core snoop message is sunk and when the correction occurs.

5. Force BlkMsgAck to remain asserted when the SNPQ credit counter temporarily changes.

6. Generate a "spoofed" response for each core snoop received, and inject it on the core-to-uncore response path.

If the PCU decides to perform a C3 exit transition, it may deassert the "C3Reached" signal, which temporarily transitions the LLC cache controller back into the drained bounce state 14 mode of bouncing core snoop messages. When the core interface is ready to resume normal snoop processing, the PCU can deassert the "BlkMsg" signal to switch the controller module back to the normal state 10.

The above techniques can be extended to support disabled cores, whether via fuse or BIOS (basic input/output system). In such a case, the BlkMsg and C3Reached signals may be simply statically asserted. If, due to a defeature mode, or other condition, a particular LLC cache controller module needs to snoop all cores, it need not be aware of which cores are enabled.

Figure 2:
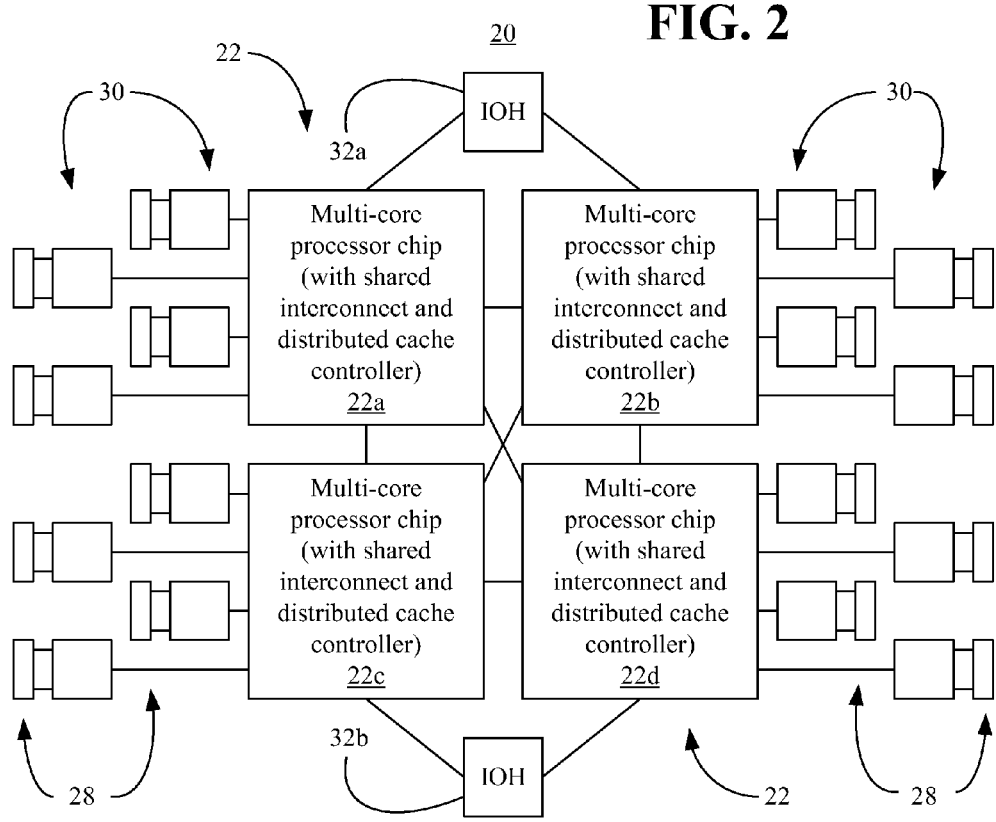
FIG. 2 is a block diagram of an example of a computing system according to an embodiment.

Turning now to FIG. 2, a computing system 20 is shown in which one or more multi-core processor package/chips 22 (22a-22d) include a shared interconnect and a distributed LLC controller. The computing system 20 could be part of a fixed platform such as a personal computer (PC), server, workstation, etc., or a mobile platform such as a laptop, personal digital assistant (PDA), wireless smart phone, media player, imaging device, etc., or any combination thereof. As already discussed, the distributed LLC controller can have a cache controller module to receive a block message signal from a power control unit, and bounce a first core snoop message on the shared interconnect in response to the block message signal. The controller module could also receive a low power level reached signal from the power control unit, and spoof a response to a second core snoop message on the shared interconnect in response to receiving the low power level reached signal. The second core snoop message could be either the bounced first core snoop message or another core snoop message.

The illustrated system also includes a system memory 28 with a scalable memory buffer 30. The system memory 28 could include dynamic random access memory (DRAM) configured as a memory module such as a dual inline memory module (DIMM), a small outline DIMM (SODIMM), etc. The system 20 may also include a input/output controller hub (IOH) 32 (32a-32b), a basic input/output system (BIOS, not shown), and other components such as a hard drive, radios that may wirelessly couple the processor die to a wireless network, and so on (not shown). Additionally, the other components may include user interface devices that may have one or more devices such as a display, keypad, mouse, etc. to allow a user to interact with and perceive information from the platform.

Figure 3:
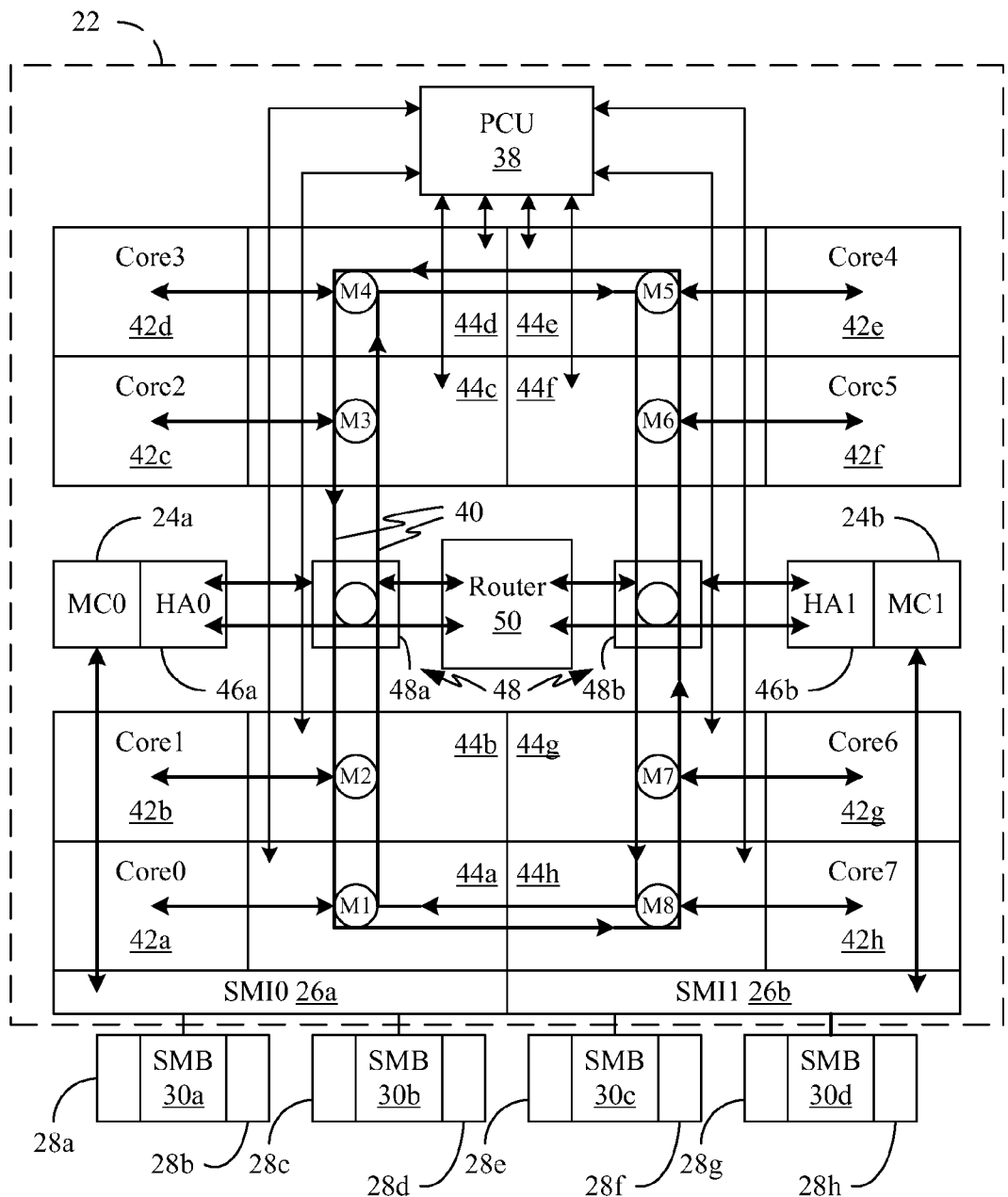
FIG. 3 is block diagram of an example of a multi-core processor chip according to an embodiment.

FIG. 3 shows one approach to a multi-core processor chip 22 in which a power control unit (PCU) 38 is integrated onto the chip 22 along with a shared interconnect ring 40 and a plurality of processor cores 42 (42a-42h), wherein each processor core 42 has a corresponding LLC slice 44 (44a-44h). The chip 22 may also include a distributed LLC controller having a cache controller module for each LLC slice-core interface. Thus, illustrated cache controller module M1 manages the interface between the core 42a, the LLC slice 44a, and the shared interconnect ring 40, the illustrated cache controller module M2 manages the interface between the core 42b, the LLC slice 44b, and the shared interconnect ring 40, and so on. Each controller module M1-M8 can detect a performance state transition in its corresponding processor core and bounce one or more core snoop messages on the shared interconnect ring 40 in response to detecting the performance state transition, wherein the core snoop message is associated with the corresponding processor core. The performance state transition may be detected by receiving a block message signal from the PCU 38 over a point-to-point connection or other link.

For example, the PCU 38 may initiate a performance state transition in the core 42b and therefore issue a BlkMsg signal to the cache controller module M2. The cache controller module M2 can then begin to drain any outstanding protocol-layer credits for core snoop messages associated with the processor core 42b. If, during this time period, another processor core such as the core 42e issues a request resulting in a core snoop message on the shared interconnect ring 40 (perhaps due to an operation involving a cached line of data), the cache controller module M2 may then bounce the message on the ring 40 instead of sinking it. The bounced core snoop message may therefore continue around the ring 40 and attempt to sink at the interface of cache controller module M2 when it returns. If, during this time period, the cache controller module M2 finishes draining any outstanding protocol-layer credits for core snoop messages, a BlkMsgAck signal can be sent back to the PCU 38. When the performance state transition in core 42b is complete, the PCU 38 may deassert the BlkMsg signal to the cache controller module M2. The next time the bounced core snoop message intended for the core 42b attempts to sink at the cache controller module M2, it may be accepted and processed in the normal fashion.

Each controller module M1-M8 can also detect a power state transition in its corresponding processor core, and spoof a response to a core snoop message on the shared interconnect ring 40 in response to detecting the power state transition, wherein the core snoop message is associated with the corresponding processor core. The power state transition may be detected by receiving a low power level reached signal from the PCU 38, wherein the low power level reached signal indicates that the corresponding processor has reached a low power state.

For example, the PCU 38 may initiate a C3 power state transition in the core 42g and therefore issue a C3Reached signal to the cache controller module M7. The cache controller module M7 can then indicate the availability of new procotol-layer credits for core snoop messages, and indicate the availability of new clock-crossing credits for core snoop messages. If another processor core such as the core 42d issues a request resulting in a core snoop message on the shared interconnect ring 40, the cache controller module M7 may then sink the core snoop message from the shared interconnect ring 40, negate the message valid bit in the sunk core snoop message (if necessary), correct the protocol-layer credit counter, generate a spoofed response for the sunk core snoop message, inject the spoofed response onto the shared interconnect ring 40, and transmit (or force the continued assertion of) the BlkMsgAck signal to the PCU 38. The spoofed response can indicate that the core 42g does not have any of the requested lines in its caches. Correcting the procotol-layer credit counter may involve returning a protocol-layer credit for the sunk core snoop message internally to the cache controller module M7.

The multi-core processor chip 22 may also be coupled to a system memory 28 (28a-28h) via a scalable memory interface 26 (SMI0/1, 26a-26b) and a scalable memory buffer 30 (SMB, 30a-30d), where a memory controller 24 (MC0/1, 24a-24b) is coupled to the SMI 26 and a home agent 46 (HA0/1, 46a-46b). The home agent 46 can be coupled to the shared interconnect 40 via a cache agent 48 (48a-48b). A router 50 may facilitate off-chip communications via a point-to-point interconnect fabric such as a QuickPath Interconnect link (not shown).

Embodiments of the present invention may therefore provide for a computing system having a dynamic random access memory, a scalable memory buffer coupled to the memory, and a multi-core processor chip. The chip may include a power control unit, a scalable memory interface coupled to the scalable memory buffer, and a shared interconnect ring. The chip can also include a plurality of cores, wherein each core has a last level cache (LLC) slice, and a distributed LLC controller coupled to the shared interconnect ring. The distributed LLC controller may have a controller module to receive a block message signal from the power control unit, and to bounce/leave a first core snoop message on the shared interconnect ring in response to the block message signal. The first core snoop message may be associated with a corresponding processor core and the block message signal can be associated with an Advanced Configuration and Power Interface (ACPI) performance state transition in the corresponding processor core. The LLC controller module might also receive a low power level reached signal from the power control unit, and spoof a response to a second core snoop message on the shared interconnect ring in response to receiving the low power level reached signal. The second core snoop message could be either the bounced first core snoop message or another core snoop message. The low power level reached signal can indicate that the corresponding processor core has reached an ACPI C3 or other non-snoopable low power state.

In such a computing system, the controller module may spoof a plurality of responses to a corresponding plurality of core snoop messages on the interconnect ring. The controller module may also sink the second core snoop message from the shared interconnect ring, generate a spoofed response for the second core snoop message, and inject the spoofed response onto the shared interconnect ring. The controller module might also indicate an availability of new protocol-layer credits for core snoops, indicate an availability of new clock-crossing credits for core snoops, negate a message valid bit in the sunk core snoop message, correct a protocol-layer credit counter, and force a block message acknowledge signal to remain asserted.

In such a computing system, the controller module may also detect a deassertion of the low power level reached signal, and discontinue the spoofing in response to the deassertion.

In addition, the controller module can bounce a plurality of core snoop messages on the interconnect ring. Moreover, the controller module can leave the first core snoop message on the shared interconnect ring, indicate an unavailability of new protocol-layer credits for core snoops, drain any outstanding protocol-layer credits for core snoops associated with the corresponding processor core, and transmit a block message acknowledgement signal to the power control unit if the draining of the outstanding protocol-layer credits has completed. The controller module may also detect a deassertion of the block message signal, and discontinue the bouncing in response to the deassertion.

Embodiments of the present invention also provide for a method of controlling an LLC in which a performance state transition in a processor core is detected. The method may also involve bouncing/leaving a core snoop message on a shared interconnect ring in response to detecting the performance state transition, wherein the core snoop message is associated with the particular processor core. The method may be implemented in fixed-functionality hardware using circuit technology such as application specific integrated circuit (ASIC), complementary metal oxide semiconductor (CMOS) or transistor-transistor logic (TTL) technology, in executable software as a set of logic instructions stored in a machine- or computer-readable medium of a memory such as random access memory (RAM), read only memory (ROM), programmable ROM (PROM), flash memory, etc., or any combination thereof.

The method may also provide for a plurality of processor cores being coupled to the shared interconnect ring via a distributed last level cache controller, and the detecting and the bouncing may be conducted by a controller module of the distributed last level cache controller that is dedicated to the processor core. In addition, the method can involve bouncing/leaving a plurality of core snoop messages on the interconnect ring. The bouncing may include draining any outstanding protocol-layer credits for core snoops associated with the processor core. Leaving the core snoop message on the shared interconnect ring can include indicating an unavailability of new protocol-layer credits for core snoops.

The method may also provide for transmitting a block message acknowledgement signal if the draining of the outstanding protocol-layer credits for core snoops has completed, wherein the transmitting can include transmitting the block message acknowledgement signal to a power control unit.

Detecting the performance state transition can include receiving a block message signal from a power control unit. The method may also provide for detecting a deassertion of the block message signal, and discontinuing the bouncing in response to the deassertion. In addition, the performance state transition may include an Advanced Configuration and Power Interface performance state transition.

Embodiments of the present invention may also provide for a chip including a shared interconnect, a plurality of processor cores, and a distributed LLC controller coupled to the shared interconnect. Each processor core may be co-located with an LLC slice, and the distributed LLC controller can have a controller module to detect a performance state transition in a corresponding processor core. The controller module may also bounce/leave a core snoop message on the shared interconnect in response to detecting the performance state transition, wherein the core snoop message is to be associated with the corresponding processor core.

In such a chip, the controller module may bounce a plurality of core snoop messages on the interconnect. In addition, each controller module in the distributed cache controller could bounce a plurality of core snoop messages on the interconnect. The controller module may also drain any outstanding protocol-layer credits for core snoops associated with the corresponding processor core. The controller module may also indicate an unavailability of new protocol-layer credits for core snoops, and transmit a block message acknowledgement signal if the draining of the outstanding protocol-layer credits for core snoops has completed. The chip can also include a power control unit, and the controller module to transmit the block message acknowledgement signal to the power control unit.

In addition, the controller module may receive a block message signal and detect the performance state transition based on the block message signal. The chip may also include a power control unit, wherein the controller module can receive the block message signal from the power control unit. The corresponding processor core could also be disabled and the power control unit may statically assert the block message signal. Alternatively, the corresponding processor core could be enabled and the power control unit may dynamically assert the block message signal. The controller module may also detect a deassertion of the block message signal, and discontinue the bouncing in response to the deassertion. The performance state transition can include an Advanced Configuration and Power Interface performance state transition, and the shared interconnect may include a shared interconnect ring.

Embodiments of the present invention may also provide for a method in which a power state transition in a processor core is detected, and a response to a core snoop message is spoofed on a shared interconnect ring in response to detecting the power state transition. The core snoop message may be associated with the particular processor core. The method may be implemented in fixed-functionality hardware using circuit technology such as ASIC, CMOS or TTL technology, in executable software as a set of logic instructions stored in a machine- or computer-readable medium of a memory such as RAM, ROM, PROM, flash memory, etc., or any combination thereof.

Embodiments of the present invention can also include a chip having a shared interconnect, a plurality of processor cores and a distributed cache controller coupled to the shared interconnect. Each processor core may have co-located a LLC slice, wherein the distributed LLC controller can include a controller module to detect a power state transition in a corresponding processor core. The controller module may also spoof a response to a core snoop message on the shared interconnect in response to detecting the power state transition, wherein the core snoop message is associated with the corresponding processor core.

Embodiments of the present invention are applicable for use with all types of semiconductor integrated circuit ("IC") chips. Examples of these IC chips include but are not limited to processors, controllers, chipset components, programmable logic arrays (PLA), memory chips, network chips, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

The techniques described herein may therefore decentralize the handling of core snoop messages during power state transitions to better accommodate a distributed implementation of the LLC cache controller, more cores, and a shared interconnect between them. Rather than pausing, aborting, or halting core snoop message generation at the source, these messages can be handled seamlessly at the relevant core interface managed by the co-located LLC cache controller.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" is used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:
1. A computing system comprising:
a dynamic random access memory;
a scalable memory buffer coupled to the memory; and
a chip including,
  a power control unit,
  a scalable memory interface coupled to the scalable memory buffer,
  a shared interconnect ring,
  a plurality of processor cores each having a last level cache slice, and a distributed last level cache controller coupled to the shared interconnect ring, the distributed last level cache controller having a plurality of controller modules associated with the plurality of processor cores, respectively, wherein each controller module associated with a processor core is to receive a block message signal from the power control unit if a performance state transition is initiated in the associated processor core and to bounce a subsequent first core snoop message directed to the associated processor core on the shared interconnect ring in response to the block message signal.

2. The computing system of claim 1, wherein each controller module associated with a processor core is to receive a low power level reached signal from the power control unit if the associated processor core reaches an Advanced Configuration and Power Interface (ACPI) C3 state and to spoof a response to a subsequent second core snoop message directed to the associated processor core on the shared interconnect ring in the response to receiving the low power level reached signal.

3. The computing system of claim 2, wherein to spoof a response to a subsequent second core snoop message comprises to sink the second core snoop message from the shared interconnect ring, to generate a spoofed response for the second core snoop message, and to inject the spoofed response onto the shared interconnect ring.

4. The computing system of claim 3, wherein, in response to receiving the low power level reached signal, each controller module associated with a processor core is to:

indicate an availability of new protocol-layer credits for core snoops;

indicate an availability of new clock-crossing credits for core snoops;

negate a message valid bit in the sunk core snoop message;

correct a protocol-layer credit counter; and force a block message acknowledge signal to remain asserted.

5. The computing system of claim 2, wherein each controller module associated with a processor core is to detect a deassertion of the low power level reached signal and to discontinue the spoofing in response to the deassertion.

6. The computing system of claim 1, wherein, in response to the block message signal, each controller module associated with a processor core is to:

indicate an unavailability of new protocol-layer credits for core snoops;

drain any outstanding protocol-layer credits for core snoops associated with the corresponding processor core; and transmit a block message acknowledgement signal to the power control unit if the draining of the outstanding protocol-layer credits is complete.

7. The computing system of claim 6, wherein the controller module is to detect a deassertion of the block message signal and discontinue the bouncing in response to the deassertion.

* * * * *

UNITED STATES PATENT AND TRADEMARK OFFICE
CERTIFICATE OF CORRECTION

PATENT NO. : 8,359,436 B2
APPLICATION NO. : 12/641728
DATED : January 22, 2013
INVENTOR(S) : James R. Vash et al.

Page 1 of 1

It is certified that error appears in the above-identified patent and that said Letters Patent is hereby corrected as shown below:

In the Claims

In column 9, line 19, in claim 2, delete "in the" and insert -- in --, therefor.

Signed and Sealed this
Fourteenth Day of May, 2013

Teresa Stanek Rea
*Acting Director of the United States Patent and Trademark Office*